United States Patent

Ikeda

[15] 3,646,611

[45] Feb. 29, 1972

[54] MAGNETIC TAPE RECORDING AND REPRODUCING DEVICE

[72] Inventor: Hisao Ikeda, Osaka, Japan

[73] Assignee: Matsushita Electric Industrial Co., Ltd., Osaka, Japan

[22] Filed: July 7, 1969

[21] Appl. No.: 839,469

[30] Foreign Application Priority Data

| | | |
|---|---|---|
| Aug. 30, 1968 | Japan | 43/62471 |
| Aug. 30, 1968 | Japan | 43/62472 |
| Aug. 30, 1968 | Japan | 43/62473 |
| Aug. 30, 1968 | Japan | 43/62474 |
| Aug. 30, 1968 | Japan | 43/62475 |
| Aug. 30, 1968 | Japan | 43/62476 |
| Aug. 30, 1968 | Japan | 43/62477 |
| Aug. 30, 1968 | Japan | 43/62478 |
| Aug. 30, 1968 | Japan | 43/62479 |
| Aug. 30, 1968 | Japan | 43/62480 |
| Aug. 30, 1968 | Japan | 43/62481 |
| Aug. 30, 1968 | Japan | 43/62482 |
| Aug. 30, 1968 | Japan | 43/62483 |
| Oct. 29, 1968 | Japan | 43/80185 |
| Oct. 29, 1968 | Japan | 43/80186 |

[52] U.S. Cl. ....................274/4 F, 274/4 E

[51] Int. Cl. ....................G11b 23/12

[58] Field of Search..........274/4 F, 11 B, 11 C; 242/180, 242/181, 197–200; 179/100.2 Z; 352/6, 8, 10, 123

[56] References Cited

UNITED STATES PATENTS

| | | | |
|---|---|---|---|
| 3,289,962 | 12/1966 | Gellenthin | 274/4 F UX |
| 3,477,726 | 11/1969 | Laschenski | 274/4 F |
| 3,495,835 | 2/1970 | Laa | 274/4 E |

OTHER PUBLICATIONS

Hanson, Edward R. Audio Engineering Society Preprint #584. 5/30/68

*Primary Examiner*—Leonard Forman
*Assistant Examiner*—Dennis A. Dearing
*Attorney*—Stevens, Davis, Miller & Mosher

[57] ABSTRACT

A novel mechanism in which a plurality of stacked cassettes housed in a cassette housing can be automatically played in succession in such a manner that when the play of a cassette which has first been brought into the play position is completed the cassette is discharged out of the cassette housing and the next cassette is brought into the play position.

15 Claims, 11 Drawing Figures

Hisao IKEDA INVENTOR

BY Stevens, Davis, Miller & Mosher ATTORNEY

MAGNETIC TAPE RECORDING AND REPRODUCING DEVICE

This invention relates to a magnetic tape recording and reproducing device, and more particularly to a novel magnetic tape recording and reproducing device in which a plurality of cassettes may be housed and automatically played in succession.

The magnetic tape recording and reproducing device of the open reel type now most widely in use is very simple in principle, but requires much trouble in mounting the tape in place or in fast forwarding and rewinding of the tape and is particularly cumbersome for children or women to manipulate.

In order to make the tape easier to handle, there have been widely used magnetic tape recording and reproducing devices of the cassette type in which a tape is housed in a cassette for easier operation thereof, and the devices of such cassette type are now more extensively used than the devices of the open reel type.

Although the cassette tape employed in the magnetic tape recording and reproducing device of the cassette type is very advantageous in operation, the small size of the cassette for housing the tape necessarily limits the quantity of the tape to be housed therein, and accordingly the program source of the tape is also limited. This requires a cassette to be manually replaced by another if a long play is desired, and such replacement of cassettes is still cumbersome for the operator of the machine although it is less so than in the case of the open reel type tape.

It is therefore the primary object of the present invention to provide a magnetic tape recording and reproducing device in which a plurality of cassettes to be played may be housed in a cassette housing and automatically played in succession without the necessity of manually replacing each cassette by another as in the prior art magnetic tape recording and reproducing device of the cassette type.

The present invention will now be described in detail by way of example with reference to the accompanying drawings, in which.

Figure 1:
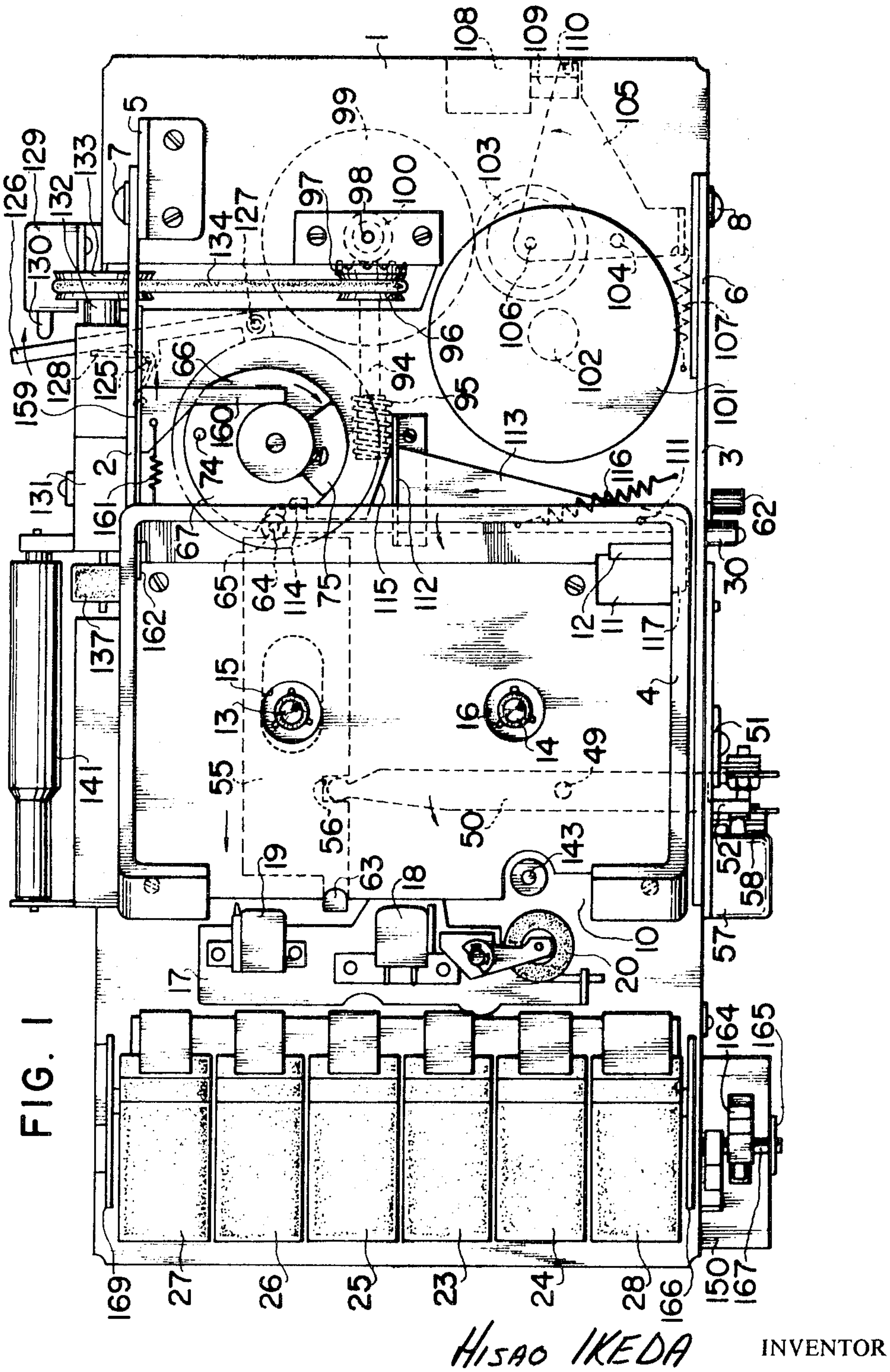
FIG. 1 is a top plan view of the magnetic tape recording and reproducing device according to an embodiment of the present invention, showing the device in its inoperative position before the cassettes are mounted in the cassette housing therein.

Referring now to the drawings, the magnetic tape recording and reproducing device according to an embodiment of the present invention comprises a chassis 1 and a cassette housing 4 overlying the chassis and having the opposite sides thereof fixed to angles 2 and 3 at one of their respective ends. The angles 2 and 3 at the other end thereof are pivotally supported on support members 5 and 6 on the chassis 1 by means of shafts 7 and 8 so that the cassette housing 4 can move toward and away from the upper surface of the chassis 1.

Figure 4:
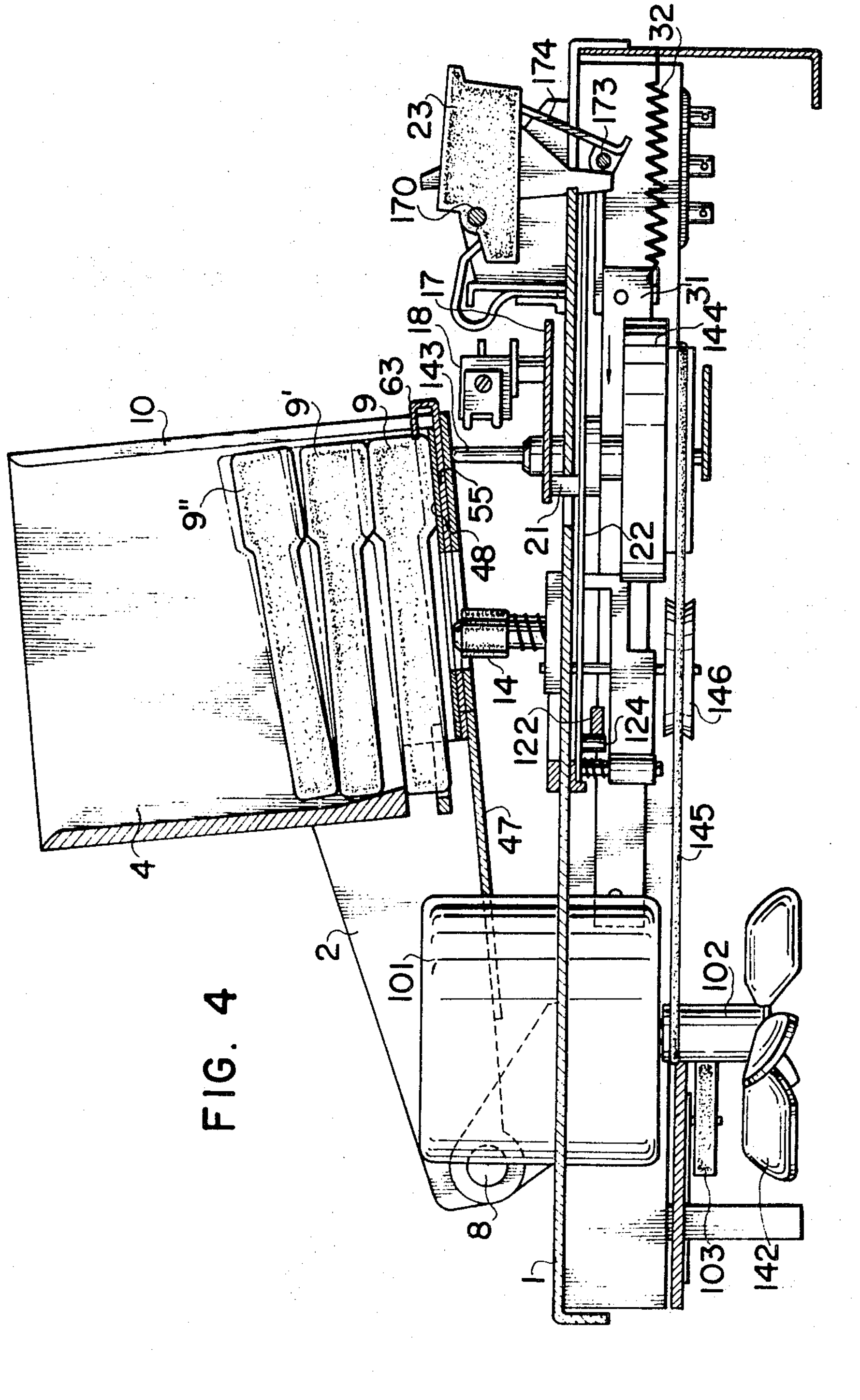
FIG. 4 is a cross-sectional side view of the device of FIG. 1 with the cassettes housed in the cassette housing.

As particularly shown in FIG. 4, the cassette housing 4 is constructed in such a manner that a cassette 9 may be placed from upward into the housing 4 and further cassettes 9′, 9″ and so on, for example, six such cassettes, may be stacked upon each other in the housing 4.

An opening 10 is formed in the front portion (in the left-hand side as viewed in FIG. 1) of the cassette housing 4, and a cutaway portion 11 is formed at one of the rearward corners (at the lower right-hand corner as viewed in FIG. 1) of the housing 4. Provision is also made for a wedgelike protrusion 12 formed above the cutaway portion 11 for positioning the lowermost cassette 9 in the cassette housing 4.

In its normal inoperative position the cassette housing 4 is raised upwardly with respect to the upper surface of the chassis 1 by a cam means to be described through the angles 2 and 3. In this position reel shafts 13 and 14 rotatably supported on the chassis 1 have their respective upper ends slightly inserted into apertures 15 and 16 formed in the underside of the cassette housing 4.

A movable plate 17 which is slidable toward the cassette housing 4 is disposed on the chassis 1 forwardly of the front opening portion of the cassette housing 4, and a record and reproduce head 18, an eraser head 19 and a pinch roller 20 are mounted on the said movable plate 17.

The movable plate 17 is normally biased forwardly by a spring (not shown), but it may be moved rearwardly by a lever 22 pushing an operating button 23, the lever 22 being disposed in the underside of the chassis 1 so as to be moved integrally with the movable plate 17 by means of a connecting pin 21, and the operating button 23 being mounted on the chassis 1. Thereby the movable plate 17 may be slid toward the cassette housing 4. Such sliding movement of the movable plate 17 toward the cassette housing 4 may also be accomplished by a cam means which is to be described.

When it is slid into the cassette housing 4, the movable plate 17 is locked in that position by a locking means. In this position the heads 18 and 19 and the pinch roller 20 are received in the cassette 9 so as to effect the play of the tape. The movable plate 17 may be released from the cassette housing 4 by pushing a stop button 24.

In addition to the operating and stop button 23 and 24, provision is made of a fast forward button 25, a rewind button 26 and a recording button 27, and further a starter button 28 for bringing into the play position the cassettes housed in the cassette housing 4.

The starter button 28 is associated with a slidable lever 31 which is disposed to be slidable by guide pins 29 and 30 along the inner side surface of the chassis 1. While the slidable lever 31 is normally urged forwardly by a spring 32, it may be moved backward against the resilient force of the spring 32 if the starter button 28 is depressed.

A guide member 34 fixed to the angle 3 by means of a pin 33 is adapted to guide the vertical movement of the cassette housing 4 which is caused by the pivotal movement of the angles 2 and 3 resulting from the engagement between an elongated slot 35 formed in the guide member 34 and a pin 36 extended from one side surface of the chassis 1.

A swing lever 38 pivoted to the guide member 34 at its upper portion by means of a pin 37 (see FIG. 2) is allowed to pivotally move by an elongated slot 40 formed therein until the slot 40 is abutted by a pin 39 studded in the guide member 34 below the said pin 37 so as to guide the pivotal movement of the lever 38. The swing lever 38 is normally urged forward within its limit of pivotal movement by a spring 43 disposed between an L-shaped projection 41 provided in the lower end portion of the lever 38 and a projection 42 of the guide member 34. A recess 44 is provided in the upper surface of the projection 41 of the swing lever 38, and the recess 44 is engaged by a pin 46 provided in the slidable lever 31 controlled by the starter button 28 and extended through an elongated slot 45 formed in the side surface of the chassis 1, whereby the swing lever 38 is moved backward against the force of the spring 43 by the pin 46 when the slidable lever 31 is slid backward.

Between a flat angle plate 47 connecting the angles 2 and 3 and a bottom plate 48 of the cassette housing 4 there is provided a swing connecting lever 50 having its center pivoted to a pin 49 studded in the flat angle plate 47. One end of the connecting lever 50 is recessed to form projections 51 and 52, of which the projection 51 engages the edge of a slot 53 formed in the swing lever 38 and the other projection 52 is formed with an upwardly extended projection 54 which is adapted to control a microswitch as later described.

The other end of the connecting lever 50 is received in a recess 56 formed in a slidable lever 55 which is slidable back and forth between the flat angle plate 47 and the bottom plate 48 of the cassette housing in a similar manner to the connecting lever 50. Accordingly, when the slidable lever 31 is slid backward and the swing lever 38 is pivotally moved, the connecting lever 50 is forced to be swung by the edge of the slot 53 formed in the swing lever 38 to thereby cause the slidable lever 55 to the slide forwardly.

Figure 2:
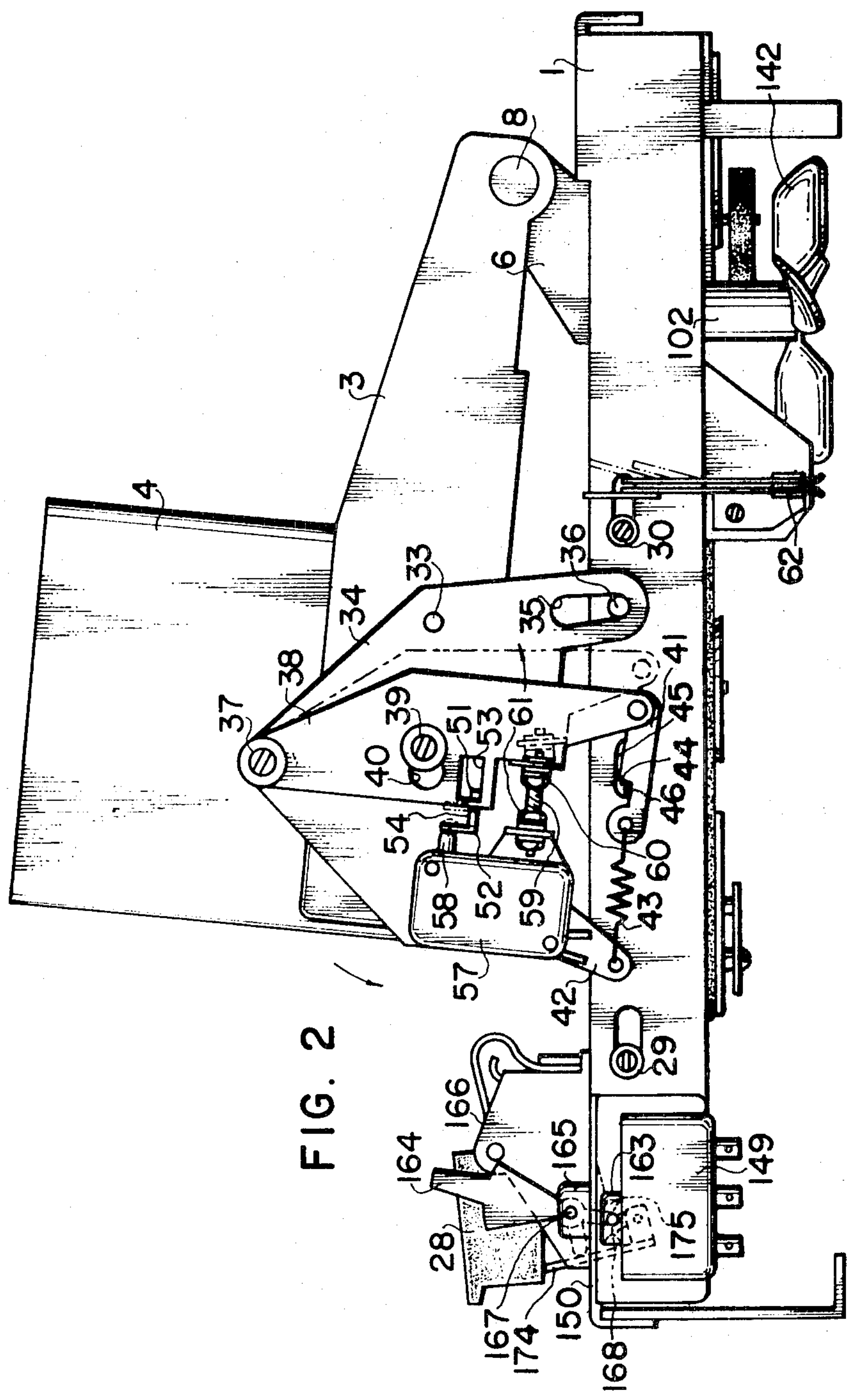
FIG. 2 is a right-hand side view thereof.

As best shown in FIG. 2, a microswitch 57 having an operating member 58 is mounted on the guide member 34, and the said operating member 58 is adapted to be controlled by the projection 54 of the connecting lever 50. The microswitch 57 is constructed so that in the normal inoperative position the operating member 58 of the microswitch is pressed by the projection 54 to open the inner circuit, the projection 54 is disengaged from the operating member 58 to close the inner circuit when the connecting lever 50 is swung to cause the slidable lever 55 to be slid forwards by the swing lever 38 in the above-described manner.

Between the guide member 34 and the swing lever 38 there is provided a switch 61 having normally closed contacts 59 and 60, of which the latter contact 60 is disengaged from the other contact 59 when the swing lever 38 is swung in the described manner. A switch 62 is mounted on one side surface of the chassis 1 and it is adapted to be controlled by the guide pin 30 guiding the slidable lever 31. The switch 62 is normally open and adapted to be closed when the slidable lever 31 is slid backward.

The microswitch 57 and the switches 61 and 62 are all controlled by the sliding movement of the slidable lever 31, and their operative relationship is such that the normally open microswitch 57 is closed immediately when the slidable lever 31 is slid backward and substantially at the same time the switch 61 is opened, whereafter the switch 62 is closed.

One end of the slidable lever 55 controlled by the connecting lever 50, that is, that end of the slidable lever 55 which is adjacent to the front opening of the cassette housing 4, is formed with an upwardly bent U-shaped projection 63, and the bent end portion of the projection 63 is slightly extended into the cassette housing 4 through the front opening 10 thereof. This end portion of the projection 63 is located so as to correspond to a small opening formed between the head insertion openings provided in the cassette 9 housed in the cassette housing 4.

A roller 65 is rotatably mounted at the other end of the slidable lever 55 by means of a pin 64 and the roller 65 engages a part of a cam means 66 which will be described hereinafter.

Figure 6:
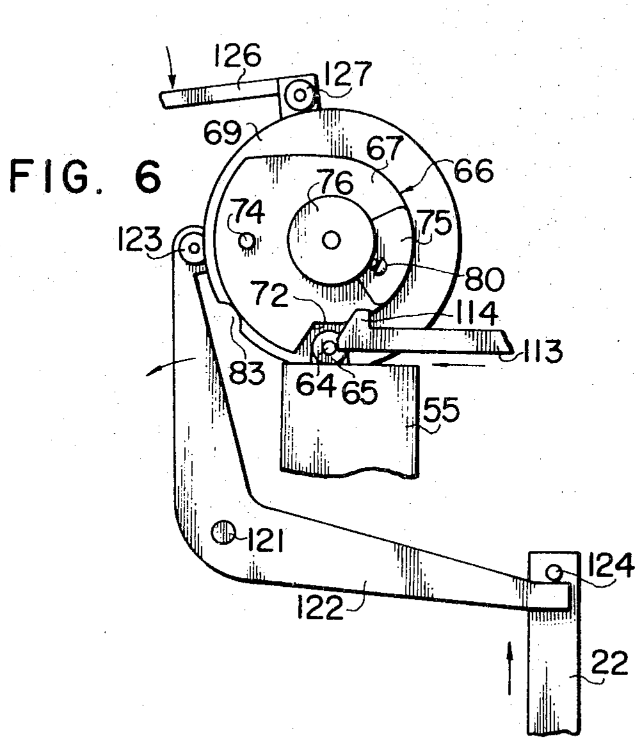
FIG. 6 is a top plan view of the mechanism portion of the device showing chiefly the cam means.
Figure 7:
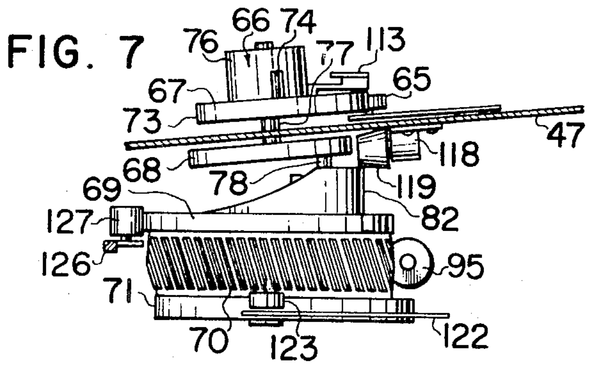
FIG. 7 shows a side view of the cam means and associated parts.
Figures 8, 9:
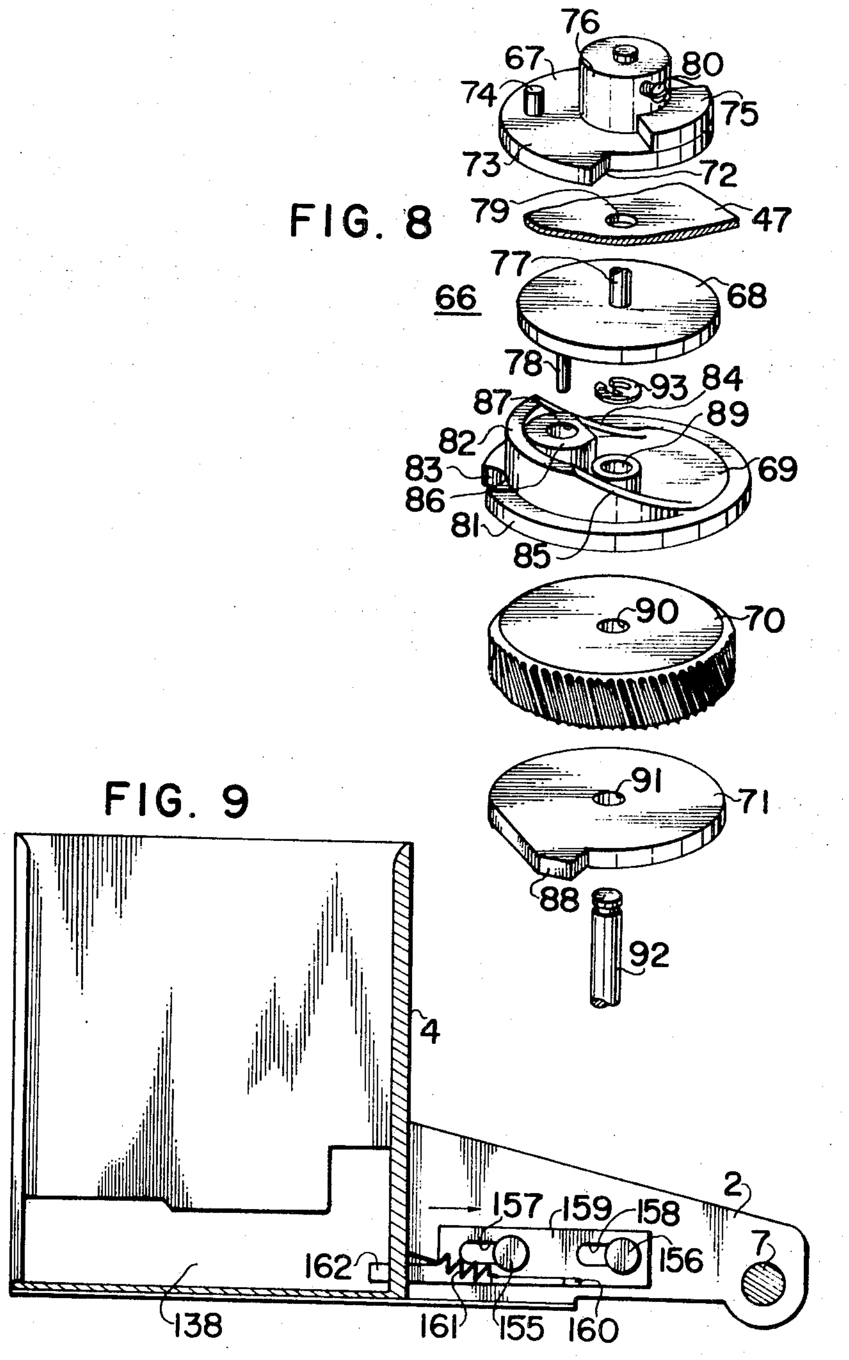
FIG. 8 is a developed perspective view of the cam means.
FIG. 9 is a cross-sectional side view of the lever portion for positioning the cassettes.

As best shown in FIGS. 6 to 8, the cam means 66 comprises a deformation plate 67, a rotation transmission plate 68, a stepped plate 69, a worm gear 70 and a baseplate 71. The deformation plate 67 consists of a disk portion 73 formed of two different circular portions integrally joined together, and having a cutaway portion 72 in one of the joints between the two different circular portions. The deformation plate 67 further includes a pin 74 studded in the disk portion 73, a flat projection 75 opposed to the pin 74, and a bearing portion 76 disposed adjacent to the flat projection 75.

The rotation transmission plate 68 has an upwardly extending center shaft 77 formed integrally therewith, and a downwardly extending pin 78 provided in the lower surface of the plate 68. The center shaft 77 is upwardly inserted through a hole 79 in the flat angle plate 47 and received into the bearing portion 76 of the deformation plate 67 where the center shaft is locked to the deformation plate 67 by means of a screw 80. Thus the deformation plate 67 and the rotation transmission plate 68 are both supported on the flat angle plate 47 so as to be rotated as a unit with the latter.

The stepped plate 69 comprises a disk portion 81 and a stepped portion 82. The disk portion 81 of the stepped plate 69 has a recess 83 formed in the outer periphery thereof, and the stepped portion 82 has its projected top surface exactly parallel with the upper surface of the disk portion 81. The ends of the stepped portion are connected with the upper surface of the disk portion 81 through gently sloped portions 84 and 85. A flat projection 86 is formed in the area of the disk portion 81 which is confined by the stepped portion 82, and the top surface of the flat projection 86 is formed with a hole 87 into which the pin 78 of the rotation transmission plate 68 is loosely fitted.

The base plate 71 forming a part of the cam means 66 has a protrusion 88 formed in the outer periphery thereof. The stepped plate 69, the worm gear 70 and the baseplate 71 are formed with center holes 89, 90 and 91 respectively, through which is passed a shaft 92 supported on the chassis 1 as by an auxiliary chassis and the shaft 92 is journaled to an E-ring 93 so as to enable these plates to be rotated as a unit.

The rotation of the stepped plate 69 is transmitted to the deformation plate 67 through the pin 78 of the rotation transmission plate 68 which is loosely fitted in the hole 87 formed in the flat projection 86 of the stepped plate 69.

The worm gear 70 is engaged by a worm 95 mounted on a shaft 94 at one end thereof, and a gear 97 integrally formed with a pulley 96 is mounted at the other end of the shaft 94. The gear 97 is in mesh engagement with a bevel gear 100 rotating integrally with an idler 99 journaled to the chassis 1 by means of a shaft 98. Thus the rotation of the idler 99 causes the cam means 66 to be rotated.

The idler 99 is adapted to receive rotational force from a motor 101 through its rotating shaft 102 and through an idler 103 which is supported on a swing lever 105 by means of a shaft 106, the swing lever 105 being pivotally supported on the back surface of the chassis 1 by means of a shaft 104. The swing lever 105 is biased by a spring 107 disposed between the lever 105 and the chassis 1 in such a manner that the idler 103 is at all times urged into contact with the idler 99 and maintained separate from the rotating shaft 102 of the motor 101.

A plunger 108 having a movable core 109 is connected with the swing lever 105 through a pin 110 mounted on the movable core 109 of the plunger. When a current is passed to the plunger 108 and the movable core 109 is drawn in and moved, the swing lever 105 is thereby swung against the force of the spring 107 and the idler 103 is urged into contact with the rotatable shaft 102 of the motor while maintaining contact with the idler 99. Thus the rotational force of the motor 101 is transmitted to the cam means 66 through the idlers 99 and 103.

Description will now be made of various elements which engage the cam means 66. The peripheral side surface of the disk portion 73 of the deformation plate 67 is engaged by the roller 65 mounted to the slidable lever 55 disposed between the bottom plate 48 and the flat angle plate 47 of the cassette housing 4. The roller 65 normally fits in the cutaway portion 72 of the disk portion 73 in the inoperative position of the device. The pin 74 on the disk portion 73 is engaged by a hooked portion 114 at one end of a cassette pushout lever 113 which is slidably mounted on the flat angle plate 47 along the rearward side surface of the cassette housing 4 so as to be slid by a pin 111 and a guide member 112. Also, the flat projection 75 on the disk portion 73 is engaged by a projection 115 extended from the cassette pushout lever 113 when the lever 113 is pulled to be moved by the pin 74, so that the engagement between the pin 74 and the hooked portion 114 is released.

The cassette pushout lever 113 is at all times pulled rightwardly, as viewed in FIG. 1, by a spring 116 mounted between the lever 113 and the flat angle plate 47. A projected member 117 formed at the end of the pushout lever 113 is disposed in such a manner that it faces laterally the cutaway portion 11 provided at one of the rearward corners of the cassette housing 4 in the normal inoperative position in which the cassette pushout lever 113 is so biased by the said spring 116 as described just above. The hooked portion 114 of the cassette pushout lever 113 may be pulled by the pin 74 against the force of the spring 116, and when this is done, the projected member 117 of the lever 113 is inserted into the cassette housing 4 and the lever 113 is forced toward the cassette housing 4 by the flat projection 75 so as to be pivotally moved about the pin 111. The pivotal movement of the lever 113 causes the hooked portion 114 to be disengaged with the pin 74, and thus the cassette pushout lever 113 instantaneously returns to its original position with the help of the force of the spring 116.

The pin 74 and the flat projection 75 on the deformation plate 67 are also adapted to be engaged by an arm 160 of a cassette-positioning lever 159 which is, as best shown in FIG. 9, slidably mounted so as to slide along the inner surface of the angle 2 by cooperation between pins 155 and 156 and corresponding elongated slots 157 and 158 provided in the lever 159. The engagement of the arm 160 with the pin 74 and the flat projection 75 on the deformation plate 67 takes place on the diametrically opposite side of the deformation plate 67 to that side on which the hooked portion 114 of the cassette pushout lever 113 engages the pin 74. The cassette-positioning lever 159 is always pulled by a spring 161 disposed between the lever 159 and the cassette housing 4 so that the arm 160 is urged into contact with the bearing portion 76 of the deformation plate 67 and one end 162 of the lever 159 is extended into a cassette discharge opening 138 of the cassette housing 4 (FIG. 9) which will be described later.

Figure 3:
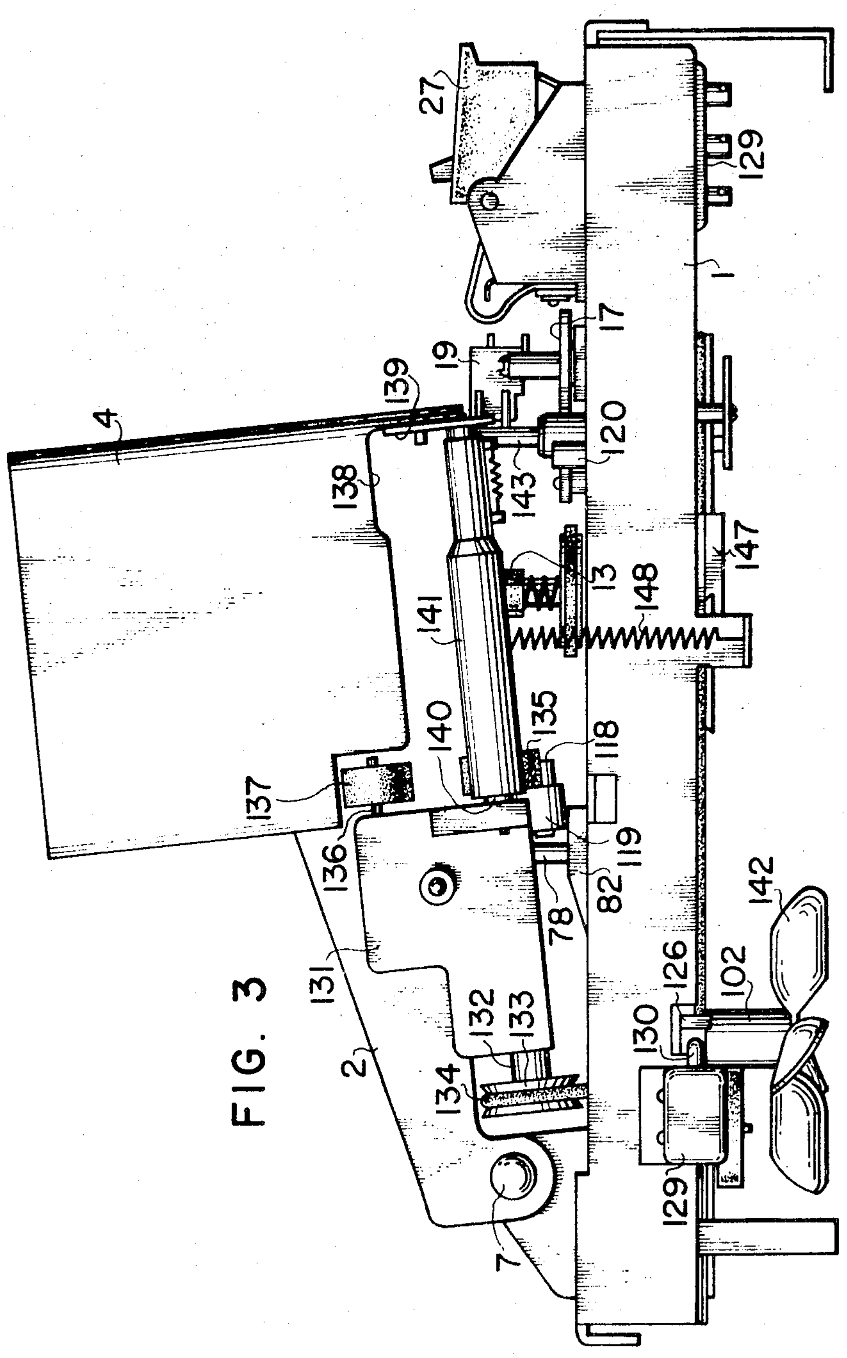
FIG. 3 is a left-hand side view thereof.

On the other hand, the stepped portion 82 of the stepped plate 69, as best shown in FIG. 3, is engaged by a roller 119 rotatably mounted on the flat angle plate 47 by means of bearing 118. Rotation of the stepped plate 69 causes the roller 119 to move from its overriding position which is normally taken with respect to the upper surface of the disk portion 81 to its underriding position with respect to the lower surface of the said disk portion. Thus the cassette housing 4 is pulled by a spring 148 provided between the flat angle plate 47 and the chassis 1 so as to be brought down onto the upper surface of the chassis 1. Further rotation of the disk portion 81 also causes the roller 119 now in engagement therewith to ride again on the top surface of the stepped portion 82 so that the cassette housing 4 is moved upward from the chassis 1 to return to its inoperative position.

When the cassette housing 4 is brought down onto the upper surface of the chassis 1 as described above, the cassette housing 4 is positioned by a pin 120 studded on the chassis 1, and in this state the cassette tape is played.

The side surface of the base plate 71 is engaged by a roller 123 rotatably mounted at one end of an L-shaped lever 122, as best seen in FIG. 6, which is pivotally mounted on the chassis 1 by means of a pin 121, and the other end of the lever 122 is engaged by a pin 124 on the lever 22 which is adapted to cause the movable plate 17 to control the heads 18 and 19 by actuating the operating button 23. Thus the cassette housing 4 is lowered to engage the pin 120, and immediately thereafter the roller 123 rides on the protrusion 88 of the pivoting baseplate 71 so as to swing the lever 122, whereby the lever 22 is pulled and moved backward to cause the movable plate 17 to move the heads 18 and 19 toward the cassette housing 4.

The peripheral side surface of the disk portion 81 of the stepped plate 69 is at all times engaged by a roller 127 through a spring 128 mounted between the chassis 1 and a lever 126 pivotally mounted at its center to the chassis 1 by means of a pin 125. The said roller 127 is rotatably mounted on the lever 126 at one end thereof. The other end of the lever 126 is opposed to an operating member 130 of a switch 129 having a normally closed contact mounted on the side surface of the chassis 1.

Immediately after the heads 18 and 19 are forced into the cassette housing 4 by the lever 22 and the baseplate 71 is further rotated to cause the roller 123 riding on the protrusion 88 to be again brought down onto the side surface of the baseplate 71 to thereby cause the heads 18 and 19 to return to its original position, the cutaway portion 83 of the disk portion 81 permits the entry of the roller 127 thereinto so as to cause the lever 126 to be swung by the force of the spring 128. This swing of the lever 126 acts to push the operating member 130 of the switch 129 so as to open the inner circuit of the switch 129.

The open circuit of the switch 129 will be immediately closed, since the roller 127 again rides on the side surface of the disk portion 81 if the stepped plate 69 is in rotation.

The functions of the cam means 66 will now be apparent from the foregoing discussion.

Turning again to FIG. 1, between the pulley 96 mounted integrally with the gear 97 on the shaft 94 transmitting the rotational force to the cam means 66 and a pulley 133 mounted at one end of a shaft 132 journaled to the side of the angle 2 by means of bearing 131, there extends a belt 134, and at the other end of the shaft 132 there is mounted a rubber roller 135 which is adapted to rotate in synchronism with the rotation of the cam means 66 through the belt 134.

The upper peripheral surface of the rubber roller 135 is at a slightly higher level than the bottom surface of the bottom plate 48 of the cassette housing 4. Above the rubber roller 135 and spaced apart therefrom by a distance slightly smaller than the height of the cassette 9, as best seen in FIG. 3, a floating rubber roller 137 is mounted to the bearing member 131 by means of a shaft 136. This floating rubber roller 137 is mounted in such a position that the shaft 136 thereof is forced downwardly in the bearing member 131 so as to allow the spacing between the rubber rollers 137 and 135 to be enlarged by the cassette inserted therebetween.

These two rubber rollers 135 and 137 are adapted to force out the lowermost cassette 9 housed in the cassette housing 4 when the cassette 9 is forced out of a discharge opening 138 formed in one side of the cassette housing 4 by the cassette pushout lever 113. The cassette 9 thus forced out is guided by a roller 141 rotatably mounted on a shaft 140 extending between the bearing member 131 and a projection 139 provided for the flat angle plate 47.

The rotating shaft 102 of the motor 101 has a motor fan 142 mounted thereon, and the rotating shaft 102 and a flywheel 144 secured on capstan shaft 143 supported by and projected from the chassis 1 are connected by a belt 145 extending therebetween, as best seen in FIG. 4. Also, when the operating button 23 is depressed and when the lever 22 is moved backward from the cam means 66 by the lever 122, the rotational force of the rotating shaft 102 is transmitted to the reel shaft 14 on the takeup side through an idler 146 engaged by the belt 145, so that the takeup of the tape is effected.

On the other hand, the supply reel shaft 13 is directly connected with a trailing end detector 147, which is associated with a transistor, a capacitor and the like and is constructed so that electrical conduction is established between the input and output of the detector when the reel shaft 13 is in its nonrotating state and electrical disconnection is provided between the said input and output when the reel shaft 13 is rotating.

The transmission of the rotational force from the fast forward button 25 and the rewind button 26 to the reel shafts 13 and 14 is accomplished through the flywheel 144.

In order that the cassettes 9, 9′, 9″ and so on stacked in the cassette housing 4 may be played both automatically and manually, there is provided a changeover switch 149 fixed below a support plate 150 supported by the chassis 1. The changeover switch 149 is provided with an operating member 163 which is slidable back and forth, and this sliding action of the operating member serves to change over the inner circuit and accordingly effected the changeover operation of the electrical circuit to be described, thus accomplishing the automatic or manual play of the tape.

A changeover lever 164 for operating the changeover switch 149 is supported in such a manner that it pivots as a unit with a shaft 167 provided between a bearing plate 165 on the support plate 150 and a frame plate 166 of each operation changer button. A projection 168 provided for the changeover lever 164 is engaged by the operating member 163 of the changeover switch 149, and the operating member 163 is caused to slide by the pivotal movement of the changeover lever 164 whereby the inner circuit is changed over.

The operating button 23, the stop button 24, the fast forward button 25, the rewind button 26 and the recording button 27 for changing over the respective operations described above are all pivotally mounted on a shaft 170 provided between the frame plate 166 and a frame plate 169 opposed thereto. All these buttons are similar in construction, and as shown in FIG. 10 in which only the button 23 is shown for example, each of these buttons is provided with an upwardly directed recess 171 adjacent to the forward end thereof and the recess 171 is formed with a projection 172 in the somewhat lower portion of the rearward inner surface thereof.

Figure 10:
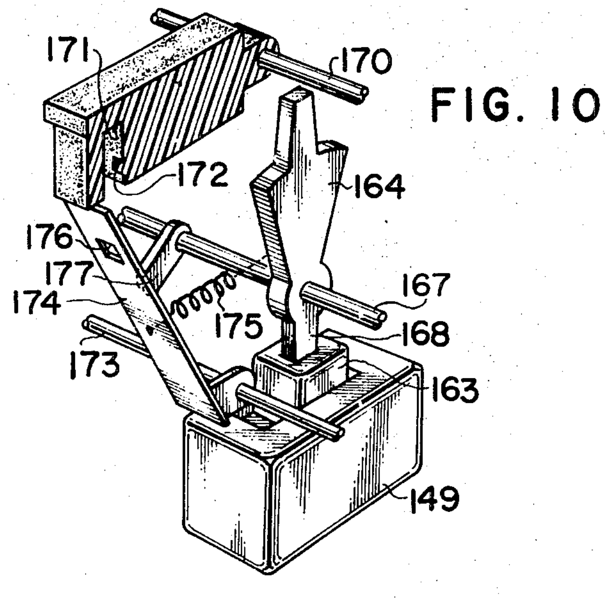
FIG. 10 is a perspective view for illustrating the relation between the changeover switch for changing over the automatic or manual play of the cassettes and the changeover button for changing over the operation.

A shaft 173 is provided to extend below these buttons between the opposite sideplates of the chassis 1, and one this shaft 173 there are mounted a plurality of levers 174 for preventing any malfunction corresponding to the operating button 23, stop button 24, fast forward button 25, rewind button 26 and recording button 27 respectively, although only one of such levers 174 corresponding to the operating button 23 is shown in FIG. 10. These malfunction preventing levers 174 are all biased clockwise by springs 175.

Each of these malfunction preventing levers 174 except the one corresponding to the stop button 24 is formed with a slot 176 on the longitudinal center line thereof slightly toward the upper end. Also, these levers 174 are opposed to engaging members 177 provided on the shaft 167 movable with the swing changeover lever 164. The operative relation between a series of buttons 23 to 27, the malfunction preventing levers 174, the changeover lever 164 and the changeover switch 149 is such that when the changeover lever 164 is in its backwardly swung position as shown in FIG. 2, the changeover switch 149 changes over the inner circuit to effect the automatic play and also at this time the engaging members 177 cause the malfunction-preventing levers 174 to swing counterclockwise against the force of the spring 175 as shown in FIG. 10, so as to maintain the end of the malfunction-preventing levers 174 in opposed relationship with the forward lower surface of each of the buttons 23, 24, 25, 26 and 27. When each lever 174 is in such position, depression of any of the buttons 23, 24, 25, 26 and 27 does not result in any changeover of the operation because the depression is hampered by the malfunction-preventing levers 174, which means that any malfunction is prevented during the automatic play.

If the changeover lever 164 is swung forward, the changeover switch 149 will change over the circuit so as to permit the manual play to be effected and the engaging member 177 stops the swing of the malfunction-preventing levers 174, whose ends are now brought into opposed relationship with the corresponding recesses 171 of the buttons 23 to 27. Depression of these buttons 23, 25, 26 and 27 will bring the said ends of the levers 174 further into the recesses 171 so that the slots 176 formed in the levers 174 are engaged by the projections 172 of the respective buttons 23 to 27, which are thus maintained in their depressed position. In this way the manual operation can be effectively maintained. On the other hand, depression of the stop button 24 causes the projection 172 thereof to swing the malfunction-preventing levers 174 against the force of the spring 175 so that the buttons 23, 25, 26 and 27 are released from their depressed position.

Figure 11:
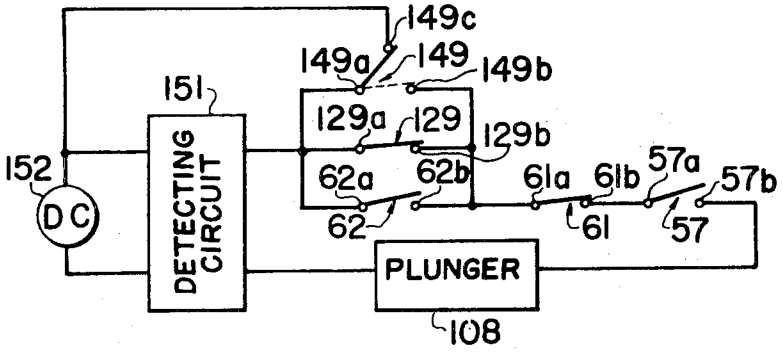
FIG. 11 is a block diagram of the electrical circuit employed in the magnetic tape recording and reproducing device according to the present invention.

Referring now to FIG. 11, description will be made of an electrical circuit comprising a detection circuit 151 which includes the microswitch 57, the switches 61 and 62, the switch 129, the changeover switch 149, the plunger 108 and the trailing end detector 147. The movable contact **149*a* of the changeover switch 149, the movable contact 129*a* of the switch 129 and the movable contact 62*a* of the switch 62 are connected with one output of the detection circuit 151 which is connected with a DC power source 152. One of the fixed contact 149*b* of the changeover switch 149, the fixed contact 129*b* of the switch 129 and the fixed contact 62*b* of the switch 62 are gang-connected with the movable contact 61*a* of the switch 61, whose fixed contact 61*b* is connected with the movable contact 57*a* of the microswitch 57. The fixed contact 57*b* of the microswitch 57 is connected with the other output of the detection circuit through the plunger 108**.

The other fixed contact **149*c* of the changeover switch 149 is connected directly with the pole of the DC power source 152 with which the movable contact 149*a* of the changeover switch 149** is connected.

The device of the present invention is constructed as has been disclosed above. Description will now be made of the operation of such device.

In the normal inoperative state, the flat angle plate 47 is pulled downwardly by the spring 148 but the roller 119 mounted to the flat angle plate 47 is riding on the stepped portion 82 of the stepped plate 69 in the cam means 66, whereby the flat angle plate 47 is raised upward together with the cassette housing 4 with respect to the upper surface of the chassis 1 as shown in FIGS. 2 to 4.

The slidable lever 31 for controlling various mechanisms by means of guide member 34 is pulled by the spring 32 into its forward position, and accordingly the swing lever 38 is also pulled forwardly by the spring 43 into its forward position. Therefore the slidable lever 55 is moved backward due to the fact that the roller 65 is received in the cutaway portion 72 of the deformation plate 67, and the upper bent end of the projection 63 of the slidable lever 55 is inserted into the cassette housing 4 from the front thereof.

The cassette pushout lever 113 is pulled by the spring 116 into its retracted position and thereby the projection 117 is facing the cutaway portion 11 of the cassette housing 4 but not inserted into the interior thereof. The cassette positioning lever 159 has its end 162 pulled by the spring 161 to pass through the outlet opening 138 of the cassette housing 4 so as to face the interior of the housing 4.

The roller 123 mounted on the lever 122 is urged into contact with the side surface of the baseplate 71 of the cam means 66, and therefore the end of the lever 122 which is adapted to engage the pin 124 is in its forward position. Accordingly the lever 22 for moving the heads 18 and 19 is also in its forward position, whereby the heads 18 and 19 are in their retracted position.

Since the swing lever 38 is in its forwardly swung position, the operating member 58 of the microswitch 57 is pressed by the projection 52 of the connecting lever 50 so as to open the associated circuit, close the switch 61 and open the switch 62, as shown in FIG. 11. The switch 129 controlled by the disk portion 81 through the lever 126 is closed since the roller 127 is urged in contact with the side surface of the disk portion 81, and the detector circuit 151 is in the conductive state since the trailing end detector 147 is stopped.

In such stopped or inoperative state, if the cassettes are placed in the housing 4 before the play is started, the first cassette 9 at its forward end portion rests on the projection 63 of the slidable lever 55 in the manner as shown by the dashed line in FIG. 4 because the projection 63 is inserted into the cassette housing 4, and accordingly the cassette 9 is housed in a first position where the forward portion thereof is spaced apart from the bottom plate 48 of the housing 4 while the rearward portion thereof is positioned on the bottom plate 48 by one end 162 of the cassette positioning lever 159 so as to rest on the bottom plate 48. Subsequently the second cassette 9′ is housed in a fourth position where it rests on the said first cassette 9, the third cassette 9″ is housed in a fifth position where it rests on the said second cassette 9′, and so on. A second and a third position are to be described.

When operation is initiated from the described inoperative condition in which the cassettes have been housed in the housing 4 in the described manner, operation can be selected interchangeably between the manual play and the automatic play by bringing the lowermost cassette 9 into its play position.

If the manual play is desired, the changeover lever 164 of the changeover switch 149 is first swung forwardly to connect the movable contact 149*a* of the switch 149 with the fixed contact 149*c* as shown in FIG. 11.

Subsequently the starter button 23 is depressed to move the slidable lever 31 backwardly or in the direction of the arrow in FIG. 4, against the force of the spring 32, then the slidable lever 31 is returned to its original position.

Such movement of the slidable lever 31 causes the connecting lever 50 to pivot in the direction as indicated by the arrow in FIG. 1, and therefore the slidable lever 55 is also caused to slide forwardly in the direction as indicated by the arrow in FIG. 1, whereby the projection 63 is released from the cassette housing 4. This release of the projection 63 from the housing 4 allows the forward portion of the lowermost cassette 9 to rest on the bottom plate 48 of the housing 4 with the aid of its own weight or the weight of the overlying cassettes 9', 9'' and so on. Also, the end of the projection 63 is inserted into the opening of the cassette 9 because the slidable lever 55 has returned to its original position due to the return of the slidable lever 31 to its original position. In this case a portion of the projection 63 is retained by the peripheral edge of the said opening of the cassette 9, which in turn is held in a second position where the cassette 9 is urged into contact with the rearward inner wall surface of the housing 4 and positioned in place in the housing 4 by the projection 63 and the protrusion 12. The projection 63 is moved slightly more forwardly than it has been in the described inoperative condition, so as to be maintained in the restrained position by the peripheral edge of the opening of the cassette 9.

The sliding movement of the slidable lever 31 in the direction of said arrow, which causes the pivotal movement of the connecting lever 50, also causes the microswitch 57 to be closed; the pivotal movement of the swing lever 38 caused in the direction of the arrow in FIG. 2 by the backward movement of the pin 46 causes the switch 61 to be opened, and subsequently to these movements the switch 62 is closed. Because of the return of the slidable lever 31 to its original position, the microswitch 57 is in a more forward position than when the slidable lever 55 is held in the retained position by the projection 63 thereof, and therefore the connecting lever 50 is also in a position slightly more swung in the direction of the arrow than in the inoperative state. Thus the projection 52 of the connecting lever 50 is held in a position moved more backward than its original position, and thereby the microswitch 57 is maintained closed.

The switch 61 is again closed because, although the connecting lever 50 is held in the swung position as described above, the swing lever 38 is pulled by the spring 43 to return to its original position while the projection 51 of the connecting lever 50 is retained in the slot 53. The switch 62 is opened by the return of the slidable lever 31 to its original position.

Due to the fact that the microswitch 57 and the switches 61 and 62 are controlled in the described manner, it will be appreciated that in the circuit shown in FIG. 11 current is passed from the DC power source 152 through the fixed and movable contacts 149*c* and 149*a* of the changeover switch 149, the switch 129, the switch 61 and the microswitch 57 to the plunger 108 which is thereby driven.

When the plunger 108 is driven, the movable core 109 thereof is moved to cause the swing lever 105 to be swung in the direction as shown by the arrow in FIG. 1 against the force of the spring 107, and thereby the idler 103 in the contact only with the idler 99 is also urged into contact with the rotating shaft 102 of the motor 101 so that the rotation of the shaft 102 is transmitted to the idler 99.

Figure 5:
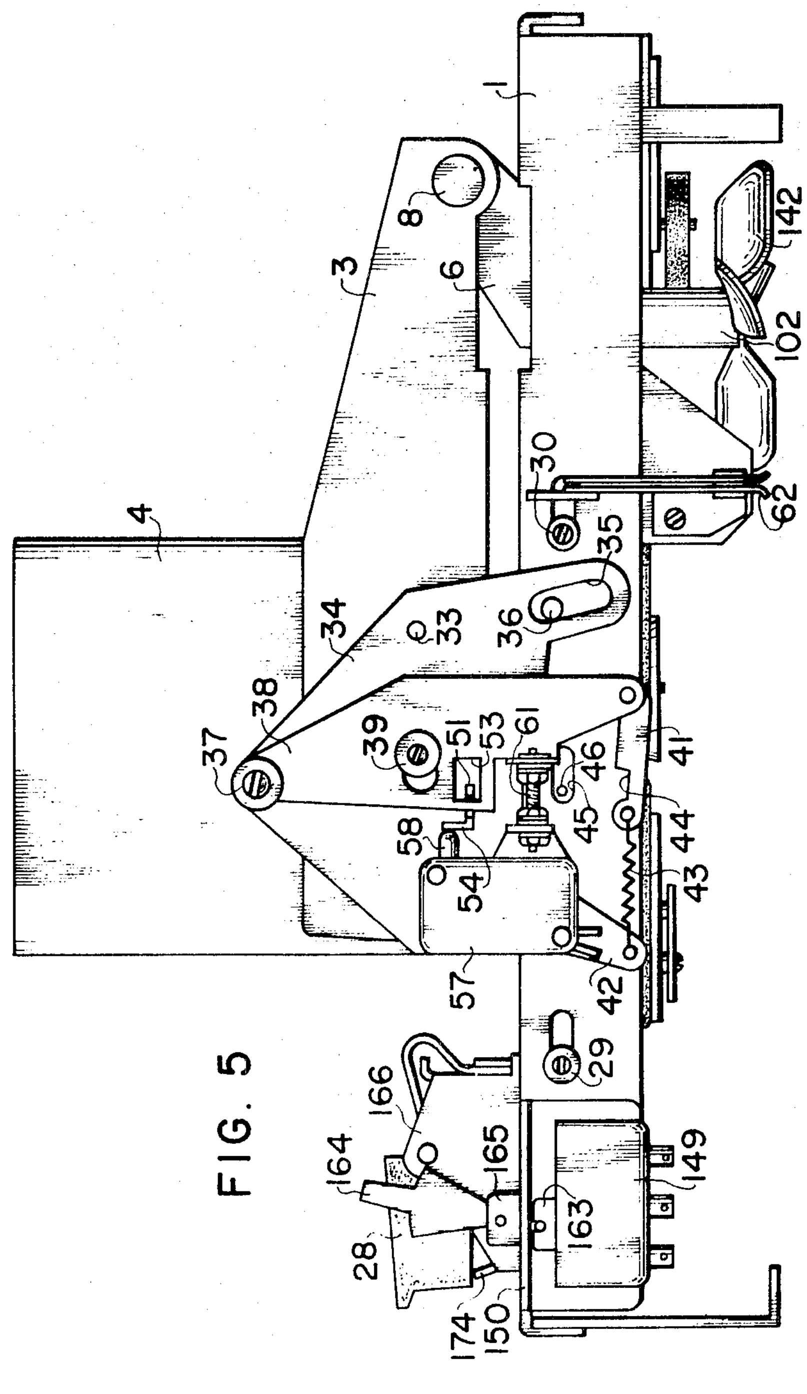
FIG. 5 is a side view showing the device in its play position.

The rotation of the idler 99 causes the worm gear 70 to be rotated through the worm 95 so that the cam means 66 starts rotation in the direction of the arrow. Because of the rotation of the cam means 66, the roller 119 which has been in contact with the upper surface of the stepped portion 82 of the stepped plate 69 now rides on the upper surface of the disk portion 81 through the sloped portion 85, and therefore the flat angle plate 47 is pulled by the spring 148 and the flat angle plate 47 pivots downwardly or in the direction as shown by the arrow in FIG. 2 about the shafts 7 and 8 of the angles 2 and 3. Thus the lower surface of the flat angle plate 47 rests on the pin 120 and takes the position as shown in FIG. 5.

Concurrently with the described movement of the flat angle plate 47, the cassette housing 4 thereon moves likewise and the lowermost cassette 9 positioned in the cassette housing 4 is brought into a third position which is the play position.

Immediately after the cassette 9 has been brought into the said third or play position, the roller 123 mounted to the lever 122, as best shown from FIG. 6, rides on the protrusion 88 formed in the base plate 71 of the cam means, so that the lever 122 moves in the direction as indicated by the arrow in FIG. 6, so as to move the lever 22 backwardly or in the direction of the arrow. The movement of the lever 22 causes the movable plate 17 to move backwardly so that the heads 18 and 19 are brought into the cassette 9 which is now in the play position. The pinch roller 20 is also moved to urge the heads 18 and 19 into contact with the tape while the pinch roller 20 is engaged by the capstan 143.

Because the cam means is maintained in the rotating state, the roller 123, which has ridden on the protrusion 88 of the baseplate 71 before the roller 119 of the flat angle plate 47 comes to the sloped portion 84, comes down again from the protrusion to ride on the baseplate 71, whereby the lever 122 returns to its initial position which it has taken prior to its pivoting, and the movable plate 17 is also returned to its original position so as to disengage the heads 18 and 19 and the pinch roller 20 with the cassette 9.

Further rotation of the cam means 66 causes the roller 127 on the lever 126 to fit into the recess 83 formed in the disk portion 81 of the stepped plate 69 just before the roller 119 of the flat angle 47 rides on the sloped portion 84. This causes the lever 126 to pivot in the direction of the arrow with the help of the return force of the spring 128 so as to push the operating member 130 of the switch 129 which will thus open its contact 129*a*.

When the switch 129 is opened the current passing to the plunger 108 is cut off, and therefore the pivoting lever 105 is returned to its initial position by the compression of the spring 107. Thus the idler 103 is disengaged with the rotating shaft 102 to stop the rotation of the cam means 66.

When the cam means 66 is stopped from rotation, the roller 119 of the flat angle plate 47 is still left to ride on the sloped portion 84 and the cassette 9 is maintained in the third position which is the play position. Also, the roller 127 remains in the recess 83 of the disk portion 81 of the stepped plate 69 with the result that the switch 129 is maintained open. The temporary backward movement of the cassette positioning lever 159 caused against the spring 161 by the pin 74 during the rotation of the cam means 66 affects the cassette 9 in no way.

At this stage, if the operating button 23 is depressed, the slidable lever 31 is caused to slide in the direction of the arrow in the same manner as the lever 22 by the cam means 66 because the tip end of the engaging member 177 is opposed to the recess 171 of the operating button 23 as described above, and such sliding movement of the slidable lever 31 is maintained because the operating button 23 remains depressed by the said engaging member 174. Therefore the movable plate 17 is also moved and accordingly the heads 18 and 19 are moved into the cassette 9. The pinch roller 20 is also moved into contact with the capstan 143. The sliding movement of the slidable lever 31 causes a rotational force to be transmitted to the reel shaft 14 to thereby effect the play of the cassette 9.

If the fast forward button 25 is depressed in the inoperative state with the cassette 9 brought into its play position, and if the rewind button 26 is also depressed, the depression of these buttons are maintained as in the case of the operating button 23, so as to enable the fast forward operation as well as the rewind operation. Depression of the recording button 27 and the operating button 23 will enable the recording to be effected on the cassette 9.

Any of these various operations can be stopped by depressing the stop button 24.

When the cassette 9 is played in the described manner and the tape in the cassette is all taken up by the takeup reel shaft 14, the supply reel shaft 13 stops its rotation because the trailing end of the tape is fixed to the supply side.

If the stop button 24 is depressed during the nonrotation of the reel shaft 13 or prior to the stoppage of the rotation, the depression of the operating button 23 maintained by the engaging member 174 as described will be released and thereby the sliding lever 22 is released from its movement to return to its original position. As a result, the heads 18 and 19 and the pinch roller 20 are retracted from the cassette 9 by the movable plate 17.

Then, if the starter button 28 is depressed the switch 62 is closed as in the case described above, so that current is passed to the plunger 108 to urge the idler 103 again into contact with the rotating shaft 102 and thereby the cam means 66 is rotated to release the roller 127 from the recess 83 and again bring the roller into engagement with the outer periphery of the disk portion 81, with a result that the switch 129 which has been opened is now closed. The closing of the switch 129 maintain the cam means 66 in rotation even if the starter button 28 is released by the operator.

The recovered rotation of the cam means 66 causes the roller 119 of the flat angle plate 47 to climb the sloped portion 84 to the stepped portion 82 to ride on the latter, whereby the flat angle plate 47 is raised to bring the cassette 9 into the second position again. In the course during which the cassette 9 is brought into the second position, the disk portion 73 of the deformation plate 67 forces forwardly the roller 65 mounted to the slidable lever 55, which in turn is moved in the direction of the arrow, whereby the projection 63 is disengaged from the cassette 9.

Also, during the time in which the cassette 9 is brought into the second position, the rotation of the deformation plate 67 causes one end 162 of the cassette-positioning lever 159 to be retracted from the cassette discharge opening 138 because the arm 160 of the lever 159 is moved backward or in the direction of the arrow by the flat projection 75 against the force of the spring 161, and when the cassette 9 has been brought into the said second position, the pin 74 is engaged by the hooked portion 114 of the cassette pushout lever 113. Thus the lever 113 is moved in the direction of the arrow against the force of the spring 116, with a result that the projection 117 is also moved from the position in which it laterally faces the cutaway portion 11 of the cassette housing 4. Thus the projection 117 is inserted into the cassette housing 4 so as to move the cassette 9 therein toward the discharge opening 138 of the housing 4.

As the cassette 9 is moved in this way, the cassette is passed through the discharge opening 138 to be inserted between the roller 135 and the floating rubber roller 137, whereupon the rubber roller 135 rotated by the rotation of the idler 99 will roll out the cassette 9 by cooperating with the roller 137 which also engages the cassette, until the cassette is guided by the roller shaft 141 so as to be discharged.

During the while the cassette 9 is being forced out by the rollers 135 and 137, the cassette pushout lever 113 which has moved the cassette 9 is instantaneously returned to its original position by the compression of the spring 116 since the projection 115 is forced by the flat projection 75 into rotation in the direction of the arrow and thereby the engagement is released between the hooked portion 114 and the pin 74.

When the lowermost cassette 9 has been played and brought into the second position and discharged out of the cassette housing 4, the second cassette 9′ which just overlays the first cassette 9 will fall under its own weight to take the second position from the fourth position in which it has been just before, and the cassette 9′ will subsequently take the third position which is the play position. A further cassette 9″ will automatically be brought from the fifth position to the fourth position, and similar automatic change in position will take place with the succeeding cassettes.

Such automatic position change of the cassettes is accomplished in the manner as described below. After the first cassette 9 has been discharged, the cam means 66 is still in its rotating state. At this time the roller 65 is moved forward by the outer peripheral surface of the disk portion 73 of the deformation plate 67 and the projection 63 is spaced apart from the cassette housing 4, and therefore the subsequent cassette 9′ coming down from the fourth position due to its own weight does not ride on the projection 63 but directly reaches the second position. The roller 65 is then brought into the cutaway portion 72 formed in the disk portion 73 of the deformation plate 67 because of the continued rotation of the cam means 66, whereby the slidable lever 55 is again moved backward so that the projection 63 thereof engages the opening of the cassette 9′ which is now in the said second position, so as to position the cassette 9′ in place.

Before the cassette 9′ is positioned in place by the projection 63 and after the cassette 9′ is brought into the second position, the cassette positioning lever 159 which has been moved in the direction of the arrow by the flat projection 75 is returned to its initial position for the first time by the rotation of the flat projection 75. Any slight deviation that may take place in the position of the cassette 9′ which has been brought into the second position by the return of the cassette-positioning lever 159 can be corrected by the said one end 162 of the positioning lever 159 so as to ensure the reliable positioning to be effected by the projection 63.

When the cassette 9′ has been positioned in place by the projection 63 of slidable lever 55, the microswitch 57 is maintained closed as in the case of the previous cassette 9 and therefore current is passed to the plunger 108 and the rotation of the cam means 66 is continued. As a result the roller 119 of the flat angle plate 47 again comes down through the sloped portion 85 onto the disk portion 81, so that the flat angle plate 47 again engages the pin 120 to bring the cassette 9′ into the third position, that is, the play position.

Also as in the case of the cassette 9, the heads 18 and 19 and the pinch roller 20 are once moved backward and thereafter return to their initial position, and the roller 127 is received into the recess 83 formed in the stepped plate 69, whereby the switch 129 is opened to make the cassette 9′ ready for play.

Thereupon, depression of the operating button 23 will start the play of the cassette 9′ in the same manner as described with respect to the cassette 9.

If the stop button 24 is depressed during the play of the cassette 9′ or upon completion of the play and if the starter button 28 is again depressed, the cam means 66 is driven to bring the cassette 9′ into the second position and from this position the cassette 9′ will be discharged in the same manner as described with respect to the cassette 9.

After the cassette 9′ has been discharged, the succeeding cassettes 9″, 9‴ and so on will also be brought successively from their respective fifth, sixth and like positions into the second position for manual play.

Description will now be made of the case where the last or uppermost cassette has been played. After the play of the last cassette has been completed and this cassette has been discharged out of the cassette housing 4, the cam means 66 is still in rotation. When the roller 65 comes intc the cutaway portion 72 formed in the deformation plate 67, the slidable lever 55 returns to its original stationary position and the connecting lever 50 also returns to its original position. Therefore the operating member 58 of the microswitch 57 is pressed by the projection 54, and thereby the microswitch 57 is opened and the current to the plunger is cut off, thus bringing all the mechanisms into the original inoperative position.

In the described manual play operation, the heads 18 and 19 and the pinch roller 20 are once inserted into the cassette to be played when the cassette is brought into the third or play position. The time required for such insertion of the heads and pinch roller is only momentary, and this does not cause any inconvenience for the play of the cassette. Further, the detection circuit 151 controlled by the supply reel shaft 13 is rendered conductive by the changeover switch 149 and this affects the circuit system in no way.

While discussion has been made about the procedures for the manual play of the recording and reproducing device according to the present invention, description will now be made of the automatic play thereof.

For the automatic play, use is made of the detection circuit 151 which is not used in the above-described manual play, so as to control the circuit system. Such control is accomplished by swinging forwardly the changeover lever 164 and closing the movable contact 149*a* of the changeover switch 149 onto the fixed contact 149*b*.

When the movable contact 149*a* of the changeover switch 149 is thus closed and the cassettes are housed in the cassette housing 4 in the manner as described, the starter button 28 is depressed. Thereupon the slidable lever 31 is caused to slide in the direction of the arrow and the slidable lever 55 is also moved forward or in the direction of the arrow, and thus the lowermost cassette 9 is brought from the first position into the second position defined in the cassette housing 4, in the same manner as previously described.

In the circuit system, the detection circuit 151 is rendered conductive when the reel shaft 13 is stopped, and therefore current is passed to the plunger 108 as in the case of the manual play. Thereby the cam means 66 is rotated and the cassette housing 4 is moved down with the downward movement of the flat angle plate 47, so that the cassette 9 is brought into the third or play position. Thereupon the lever 22 is moved backward or in the direction of the arrow by the projection 88 of the baseplate 71 in the cam means through the lever 122, and thus the heads 18 and 19 and the pinch roller 20 are inserted into the cassette 9 which is now in the said play position. At the same time the movement of the lever 22 causes the takeup reel shaft 14 to be rotated. When the cassette tape is forwarded by these drive means, the detection circuit is electrically disconnected.

The electrical disconnection of the detection circuit means the cutoff of the current passing to the plunger 108 and the cam means 66 is stopped from rotation. Therefore the cassette 9 is maintained in its play position to enable the automatic play thereof.

When all the tape is taken up by the takeup reel shaft 14 and the reel shaft 14 stops its rotation, the supply reel shaft 13 also stops its rotation and thereby the detection circuit 151 is rendered conductive. As a result current is again passed to the plunger 108 to start the rotation of the cam means 66 again, so that the heads 18 and 19 and the pinch roller 20 are disengaged with the cassette 9 while the reel shaft 14 is disconnected with the drive, and the cassette 9 is raised from the third or play position to the second position.

Before the cassette 9 is thus raised to the second position, the switch 129 is once opened but this has nothing to do with the circuit system because the circuit constituted by the switch 129 is short circuited by the movable contact 149*a* and fixed contact 149*b* of the changeover switch 149. Consequently the cam means 66 continues to rotate so as to raise the cassette 9 into the second position.

When the cassette 9 has been so raised, the cassette pushout lever 113 forces out the cassette 9 in the manner already described.

After the lowermost cassette 9 has been discharged, the next cassette 9′ in the fourth position comes down directly into the second position and is positioned in place by the projection 63 due to the continued rotation of the cam means 66. Thereafter the cassette 9′ is brought into the third or play position and automatically played in the same manner as the cassette 9.

Upon the completion of the play of the cassette 9′, the detection circuit 151 acts to raise the cassette 9′ again to the second position now for discharge. Subsequently, the third cassette 9‴ which initially takes the fifth position but is now brought into the fourth position by the discharge of the first cassette 9 will take the second position ready for play.

In this way the cassettes housed in the cassette housing 4 can be played automatically and when the play of the last cassette is completed and this cassette is discharged out of the housing 4, all the mechanisms are stopped as in the case of the described manual play.

When the changeover lever 164 for effecting the automatic play is so changed over, the engaging member 177 causes the malfunction preventing levers 174 to pivot against the force of the spring 175 until the end of each malfunction-preventing levers 174 comes into opposed relationship with the forward lower end surfaces of the buttons 23, 24, 25, 26 and 27 for changing over the various operations. Therefore, these buttons 23 to 27 cannot significantly be depressed during the automatic play and thus any malfunction can be prevented effectively.

While the present invention has been disclosed with respect to the case where the cassette housing is movable relative to the chassis so that the cassettes in the housing may be played, it is readily possible with the same result, according to the present invention, to make the cassette housing fixed and the chassis movable relative thereto so as to enable the lowermost cassette in the housing to be played likewise.

What is claimed is:

1. A magnetic tape recording and reproducing device, comprising a chassis; a vertically movable cassette housing; means pivotally mounting said housing on said chassis; said housing being adapted to house a plurality of cassettes in stacked relationship; wherein in a first inoperative position, said housing is disposed above said chassis and in a second operative position said housing is disposed on said chassis and lower than in said first position; a plurality of drive shafts mounted on said chassis; means maintaining said cassettes out of contact with said shafts in said first position of said housing; means operatively engaging a lowermost of said cassettes with said drive shafts in said second position of said housing; a discharge opening in said housing through which said ejecting means ejects said lowermost cassette upon said completion of play; and means for ejecting said lowermost cassette from said housing when said housing is in said first position.

2. A magnetic tape recording and reproducing device according to claim 1, further comprising means automatically moving said housing upwardly of said chassis into said first position upon completion of play of said lowermost cassette; a succeeding one of said plurality of cassettes being moved into the position vacated by said lowermost cassette after ejection thereof; and means automatically lowering said housing into said second position wherein said succeeding cassette operatively engages said drive shafts.

3. A magnetic tape recording and reproducing device according to claim 1, further comprising cam means having a rotatable stepped portion which engages said housing wherein the amount of vertical movement of said housing is dependent upon the height of that part of the stepped portion engaging said housing.

4. A magnetic tape recording and reproducing device according to claim 1, further comprising means positioning said lowermost cassette in a playing position, including a lever mounted on said housing which engages a first portion of said lowermost cassette and a projection formed on an inner wall of said housing which engages a second portion of said lowermost cassette.

5. A magnetic tape recording and reproducing device as defined in claim 4, further comprising means moving said housing into said second position, said moving means including a switch controlled by said lever mounted on said housing.

6. A magnetic tape recording and reproducing device as defined in claim 4, further comprising means retracting said positioning lever from said housing before the lowermost cassette is discharged and means moving said positioning lever forward into said housing after a next succeeding one of said plurality of cassettes as moved into the position vacated by said lowermost cassette after ejection thereof to position said next succeeding cassette in place.

7. A magnetic head tape recording and reproducing device according to claim 1, further comprising an opening formed in a front face of said housing, said opening extending from a lower to an upper edge of said front face; magnetic head means disposed on said chassis; and means moving said magnetic head means through said opening into operative engagement with said lowermost cassette when said housing is in said second position.

8. A magnetic tape recording and reproducing device according to claim 7, wherein said moving means includes a motor; and further comprising means connected to said motor for selecting one of automatic and manual modes of operation of said device.

9. A magnetic tape recording and reproducing device as defined in claim 1, further comprising a motor, a switch controlling said motor, a slidable lever sliding back and forth and disposed on the underside of said cassette housing, a connecting lever pivoted at the center thereof and having one end thereof associated perpendicularly with said slidable lever, one end of said slidable lever being bent so as to project into said housing and the other end of said slidable lever engaging a portion of said cam means rotated and controlled by said motor for moving said slidable lever and said cassette housing, the other end of said connecting lever being adapted to engage said switch controlling said motor, said projection being adapted when the cassette is positioned in place in said cassette housing to engage said cassette to displace said slidable lever, so that said switch is controlled to drive said motor, whereby said housing is moved downwardly to bring said cassette into the play position, and upon completion of the play said slidable lever is driven by said cam means so as to disengage the cassette with said housing.

10. A magnetic tape recording and reproducing device as defined in claim 1, wherein a changeover switch is provided to effect the automatic or manual play of the cassettes containing magnetic tapes therein, and when the changeover switch is changed over for the automatic play the operating button provided for the manual play is not operable in relation to said changeover for the automatic play.

11. A magnetic tape recording and reproducing device as defined in claim 2, said ejecting means further comprising a cassette pushout member disposed on said housing for forcing the cassettes to move toward said discharge opening, rollers mounted on said housing for guiding said cassettes discharged out of said cassette housing by said pushout member through said discharge opening, and a positioning member for positioning at least the lowermost cassette in place, and after said lowermost cassette has been positioned in place by said positioning member said cassette housing is moved downwardly to bring said cassette into a playing position in which the cassette is associated with magnetic head means movably mounted on said chassis, and upon completion of the play of the cassette, said cassette housing moves upwardly and said positioning member releases its positioning operation, whereafter only the lowermost cassette is forced to move by said pushout member so that said cassette is guided by said rollers so as to be discharged out of the cassette housing.

12. A magnetic tape recording and reproducing device according to claim 10, further comprising rotatable cam means having a plurality of control portions, wherein a first portion controls movement of said housing, a second portion controls movement of said cassette pushout member and a third portion controls movement of said cassette positioning member; and means driving and stopping said cam means, including a switch controlled by a further control portion of said cam means and means for detecting the trailing end of a magnetic tape contained in said lowermost cassette.

13. A magnetic tape recording and reproducing device as defined in claim 11, further comprising means, including a first pin provided on a rotatable disc, for actuating said cassette pushout member and means, including a second pin provided on said disc, for releasing said pushout member.

14. A magnetic tape recording and reproducing device as defined in claim 11, wherein said rollers comprise a pair of upper and lower rollers disposed in said cassette discharge passage, the spacing between said two rollers is slightly smaller than the height of the cassette, at least one of said two rollers is driven, and the cassette forced out of said housing by said pushout member is discharged by said driven roller while being held by and between said two rollers.

15. A magnetic tape recording and reproducing device as defined in claim 14, wherein at least one of said two rollers is adapted to move toward and away from the other roller.

* * * * *